(12) United States Patent
Nakami et al.

(10) Patent No.: US 7,598,983 B2
(45) Date of Patent: Oct. 6, 2009

(54) CONTROL OF IMAGE OUTPUT USING IMAGE PROCESSING CONTROL DATA

(75) Inventors: Yoshihiro Nakami, Nagano-ken (JP); Kenji Fukasawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 738 days.

(21) Appl. No.: 10/472,314

(22) PCT Filed: Oct. 21, 2002

(86) PCT No.: PCT/JP02/10888

§ 371 (c)(1),
(2), (4) Date: Sep. 16, 2003

(87) PCT Pub. No.: WO03/036960

PCT Pub. Date: May 1, 2003

(65) Prior Publication Data

US 2004/0090534 A1    May 13, 2004

(30) Foreign Application Priority Data

Oct. 23, 2001    (JP)    ............................. 2001-325097

(51) Int. Cl.
*H04N 5/228*    (2006.01)
(52) U.S. Cl. ................. 348/222.1; 348/69; 348/207.11; 348/211.4
(58) Field of Classification Search ............... 348/222.1, 348/69, 207.11, 211.4, 211.5, 211.6, 211.7, 348/211.8, 211.9, 211.1, 211.11, 211.12, 348/211.13
See application file for complete search history.

(56) References Cited

U.S. PATENT DOCUMENTS 5,424,774 A * 6/1995 Takayama et al. ........ 348/222.1

(Continued)

FOREIGN PATENT DOCUMENTS

EP    0 782 325    7/1997

(Continued)

OTHER PUBLICATIONS

Abstract of Japanese Patent Publication No. 10-334212, Pub. Date: Dec. 18, 1998, Patent Abstracts of Japan.

(Continued)

*Primary Examiner*—Jason Chan
*Assistant Examiner*—Usman Khan
(74) *Attorney, Agent, or Firm*—Martine Penilla & Gencarella, LLP

(57) ABSTRACT

The present invention makes an image data supplier such as an image shooting apparatus controllable of image processing that is performed in an image output apparatus according to image data for the purpose of improving image quality.

In the present invention, control data, which is used to control image processing that is performed in an image output apparatus, is set in correlation with image data. A digital camera 10 performs image analysis of shot image data to set control data, and outputs the control data in correlation with the image data. This allows for the control of the image processing that is performed in the image output apparatus. Since the control data is not previously prepared uniform data but is set based on the analysis of the image data, the image processing can be performed as appropriate for each image.

11 Claims, 5 Drawing Sheets

U.S. PATENT DOCUMENTS

| | | | |
|---|---|---|---|
| 5,475,420 A * | 12/1995 | Buchin | 348/72 |
| 6,751,349 B2 * | 6/2004 | Matama | 382/167 |
| 6,836,565 B1 | 12/2004 | Nishikawa | |
| 7,194,130 B2 | 3/2007 | Nishikawa | |
| 7,397,574 B1 | 7/2008 | Oida | |

FOREIGN PATENT DOCUMENTS

| | | | |
|---|---|---|---|
| EP | 0 838 939 | | 4/1998 |
| JP | 10-191246 | | 7/1998 |
| JP | 10-334212 | | 12/1998 |
| JP | 10334212 A | * | 12/1998 |
| JP | 11041622 A | * | 2/1999 |
| JP | 11-220687 | | 8/1999 |
| JP | 11-261938 | | 9/1999 |
| JP | 2000-137806 | | 5/2000 |
| JP | 2001-142671 | | 5/2001 |
| JP | 2001-186297 | | 7/2001 |

OTHER PUBLICATIONS

Abstract of Japanese Patent Publication No. 2000-137806 Pub. Date: May 16, 2000, Patent Abstracts of Japan.
Abstract of Japanese Patent Publication No. 10-191246, Pub. Date: Jul. 21, 1998, Patent Abstracts of Japan.
Abstract of Japanese Patent Publication No. 11-220687, Pub. Date: Aug. 10, 1999, Patent Abstracts of Japan.
Abstract of Japanese Patent Publication No. 11-261938, Pub. Date: Sep. 24, 1999, Patent Abstracts of Japan.
Abstract of Japanese Patent Publication No. 2001-186297, Pub. Date: Jul. 6, 2001, Patent Abstracts of Japan.
Abstract of Japanese Patent Publication No. 2000-137806, Pub. Date: May 15, 2000, Patent Abstracts of Japan.
Abstract of Japanese Patent Publication No. 2001-142671 Pub. Date: May 25, 2001, Patent Abstracts of Japan.

* cited by examiner

CONTROL OF IMAGE OUTPUT USING IMAGE PROCESSING CONTROL DATA

TECHNICAL FIELD

The present invention relates to a technique to control image processing that is performed in an image output apparatus and to obtain desirable image outputs.

BACKGROUND ART

A method that enables an image output apparatus e.g. a printer to output image data generated by an image shooting apparatus e.g. a digital still camera (DSC) as an image is becoming increasingly widespread. Some of the image output apparatuses analyze the image data and automatically perform image processing for the purpose of improving image quality. Such image processing may include, for example, an adjustment of color balances that are used to represent appropriate skin tones of a portrait.

Such image processing, however, is performed in an image output apparatus regardless of characteristics of each image shooting apparatus, which results in the image processing unable to achieve a sufficient level of image adjustment that reflects the characteristics of each image shooting apparatus. In some cases, the characteristics of each image shooting apparatus as well as intentions of each user may even be impaired due to unnecessary corrections.

Such a problem is common to any case where an image output apparatus analyzes image data and performs image processing on its own. This similarly applies to a case where an image output apparatus that is supplied with image data from a server performs image processing and outputs an image.

The purpose of the present invention is thus to solve the aforementioned problem and to make an image data supplier such as an image shooting apparatus controllable of image processing that is performed in an image output apparatus according to image data for the purpose of improving image quality.

DISCLOSURE OF THE INVENTION

In order to solve at least a part of the aforementioned problem, the present invention sets control data, which is used to control image processing that is performed in an image output apparatus, in correlation with image data. The control data is set in the image output control apparatus by: inputting image data to be a subject of setting; performing an image analysis; setting the control data; and then outputting the control data in correlation with the image data. This allows for the control of the image processing that is performed in the image output apparatus. Since the control data is not previously prepared uniform data but is set based on the analysis of the image data, the image processing can be performed as appropriate for each image.

The image output control apparatus is an apparatus that supplies the image data and the control data to the image output apparatus, and may be configured as a server or a computer, for example, that reads a separately prepared image file, sets the control data, and then supplies the control data to the image output apparatus.

The image output control apparatus may also be configured as an image shooting apparatus that comprises an image shooting module for shooting images. The image shooting apparatus may include: a digital still camera, a digital video camera, a scanner, and such. The image shooting apparatus may analyze output data from the image shooting module, or may read and analyze an image file that is temporally stored in the image shooting apparatus. The image shooting apparatus can advantageously make use of its characteristics for the setting of the control data.

The present invention can also provide another advantages based on the difference of throughputs between the image output apparatus and the image output control apparatus. First, in case where the image output control apparatus has a lower throughput than the image output apparatus, the present invention can prevent the image output control apparatus with the lower throughput from being subjected to an excessive processing load. This is because it is not the image output control apparatus that completes the image processing in the present invention. On the other hand, since it is the image output control apparatus that sets the control data, the image output control apparatus can obtain an image output that well reflects the characteristics of the image output control apparatus.

On the other hand, in case where the image output control apparatus has a higher throughput, the image output control apparatus can perform an image analysis that is both more advanced and more complex than that performed in the image output apparatus. This allows for further improvement in image quality than in case where the image analysis is performed in the image output apparatus.

Since the present invention makes effective use of the difference of throughputs between the image output control apparatus and the image output apparatus, whether or not to perform the image analysis in the image output control apparatus may be regulated based on the comparison of throughputs between the apparatuses. The throughput of the image output apparatus may be held in the image output control apparatus beforehand in correlation with the type of the image output apparatus, or may be inquired by the image output control apparatus into the image output apparatus if the apparatuses are communicative each other. Each throughput may be represented with a parameter, e.g. a driving frequency of a circuit that is used for image processing in each apparatus. Under the aforementioned regulation, the image analysis may be performed in the image output control apparatus if the apparatus has a higher throughput, and may not be performed in the image output control apparatus if the apparatus has a lower throughput. In the latter case, the image output control apparatus may set the control data that causes the image output apparatus to perform the image analysis. In this manner, the image output apparatus may be able to determine easily whether or not need to perform the image analysis.

Details of the image analysis and the image processing in the present invention can be set by various parameters including: contrast, brightness, color balance, white balance, chromaticness, adjustment in sharpness, memory color, and etc.

In the present invention, the image output control apparatus may set the control data based on defaults that are prepared beforehand, or may be able to reflect preferences of each user. For example, the image output control apparatus may store adjustment data that is used to adjust trends in the setting of control data, so that an analysis module may reflect the adjustment data to set the control data. The control data can also reflect preferences of each user if the user sets the adjustment data.

In the present invention, output process of the control data may take various aspects. In a first aspect, the control data may be output as an image file that includes the image data and the control data integrated together. For example, the image file may take a form of the image data with the control data embedded in its header. In a second aspect, the control data may be output as a separate file that is associated with the image file. In a third aspect, the control data may be output to the image output apparatus via communication.

The present invention is not restricted to the image output control apparatus and the image shooting apparatus described above, but may also be configured in various other aspects. For example, the present invention may be a control data setting method that sets control data, which is used to control image processing that is performed in an image output apparatus, in correlation with image data. The present invention may also be configured as a computer program that is used to make such settings by a computer, and a computer readable recording medium that is recorded with such a computer program. As for the recording medium, various computer readable recording medium may be used such as a flexible disk, a CD-ROM, a DVD, a magnetic optical disk, an IC card, a ROM cartridge, a punch card, a printed material with code such as bar code printed there on, an internal storage (memory such as RAM or ROM) and an external storage of a computer, and etc.

The present invention may also be configured as an image output apparatus, which is a sub combination to the image output control apparatus and the image shooting apparatus described above. Such an image output apparatus is configured to: input the image data and the control data; perform the image processing to the image data based on the control data; and then output an image. The image output apparatus may also be configured to analyze the image data and perform the image processing as in the prior art, in case where no effective control data was input or the received control data indicated to perform the image analysis.

BEST MODE OF THE INVENTION

Figure 1:
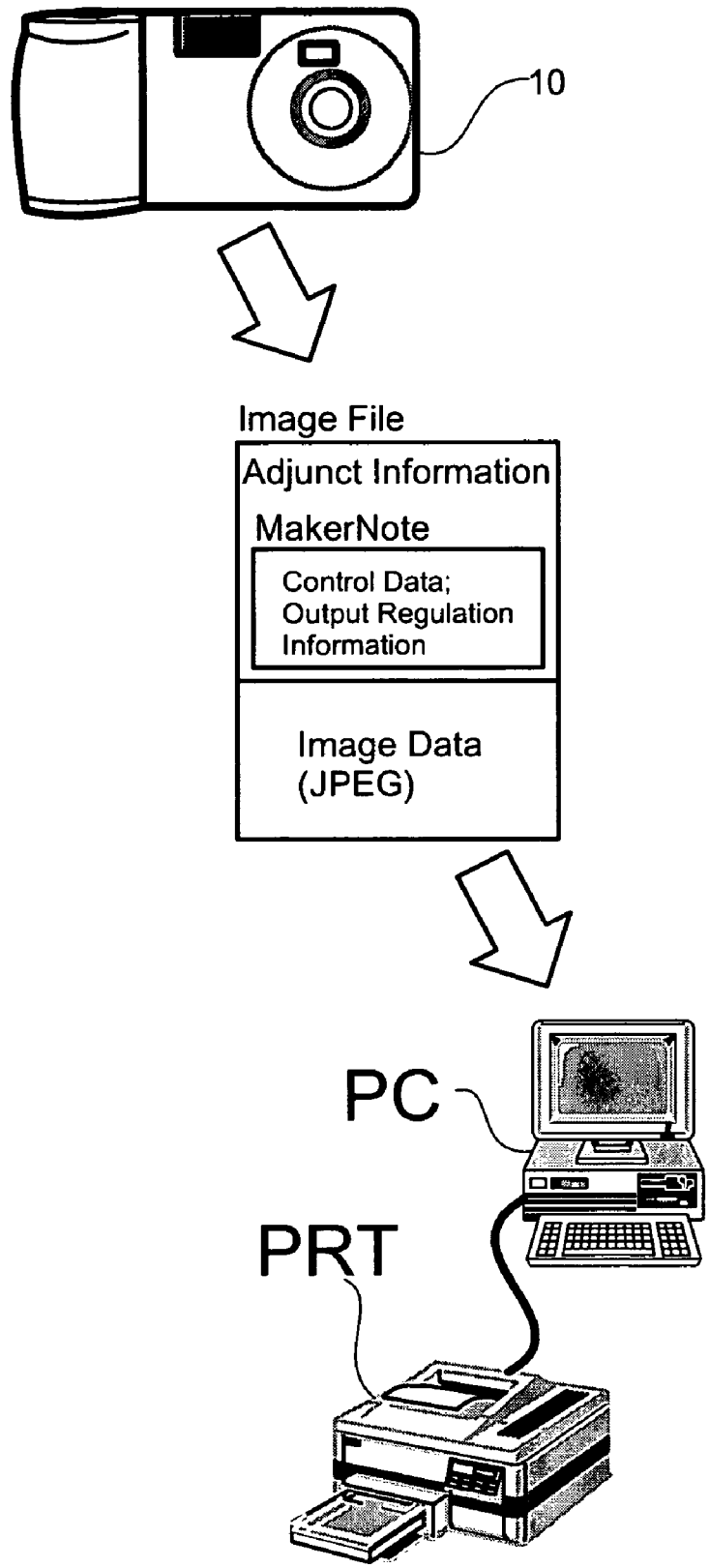
FIG. 1 is a schematic that shows the general configuration of an image output system as an embodiment.

Preferred embodiments of the present invention will be described under the following sections:
A. System Configuration
B. Generation of Image File
C. Output of Image
D. Modifications A. System Configuration FIG. 1 is a schematic that shows the general configuration of an image output system as an embodiment. The system includes a digital camera 10 that functions as an image shooting apparatus; and a personal computer PC and a printer PRT that function as an image output apparatus. The digital camera 10 generates an image file when operated by a user. The image file is transferred to the image output apparatus via media or communication.

The image file contains the image data and its adjunct information as shown. Although the image data is of JPEG format in the present embodiment, other formats may also be used as well. The adjunct information is configured as a header of the image data. In the present invention, the header portion is recorded with shooting date, shutter speed, and other shooting information in the Exif format, which is an image file format for digital still cameras. The header portion is also recorded with the control data that is used to control the image processing that is performed in the image output apparatus, as well as output regulation information that regulates the number of papers to be output. Although the control data and the output regulation information are recorded in a field that is referred to as MakerNote in the Exif format in the present embodiment, the recording in this embodiment is not restricted to this way.

The control data is used to control the details of the image processing that is performed for the image data in the process of outputting an image. The control data can be classified into two main categories: color space parameters and color correction parameters.

The color space parameters are utilized to transfer color reproduction characteristics of the image shooting apparatus to the image output apparatus so as to realize the accurate color reproduction for each object. These parameters include: a gamma correction value responsive to the characteristics of the image shooting apparatus; and a parameter for specifying a color space conversion method. The parameter for specifying a color space conversion method is utilized to specify a color space conversion method that is used in the image processing according to the color reproduction range available in the image shooting apparatus. In the present embodiment, the digital camera 10 uses two types of color spaces: sRGB and NTSC. Since the color spaces have different color reproduction ranges, employing the same conversion method for both of the color spaces in the image processing may unnecessarily limit the color reproduction range of one of the color spaces. The parameter for specifying a color space conversion method is thus utilized to specify a color conversion method, so that the image processing can be performed without narrowing the color reproduction range expected at the time of shooting. The parameter for specifying may be set in various formats. In the present embodiment, for example, the parameter is set as a parameter that specifies which color space, i.e. RGB or NTSC, was used at the time of shooting. The parameter for specifying may also take a form of a conversion matrix that is used in the color space conversion.

The color correction parameters are utilized to transfer the intentions of the shooter and the characteristics of the digital camera 10 to the output apparatus. The parameters include the ones associated with: contrast, brightness, color balance, white balance, chromaticness, sharpness, memory color, and etc. The memory color is a color that is used as a basis of color tone adjustment of the image data. The aforementioned parameters are merely illustrative, and the control data may include other parameters as well, or may include only some of the parameters described above.

The personal computer PC reads an image file, analyzes the details of the image file, performs the image processing that is specified by the control data, and then prints the image with the printer PRT. The personal computer PC is installed with a software for implementing such processing. As is generally known, the software may be installed into the personal computer PC via a recording medium such as a CD-ROM or via a network. Although the combination of the personal computer PC and the printer PRT constitutes an image output apparatus in the present embodiment, the computer PC may possibly be eliminated by using a printer that can implement the image processing all by itself. Alternatively, an image display apparatus such as a display or a projector may be used to output images instead of the printer.

Figure 2:
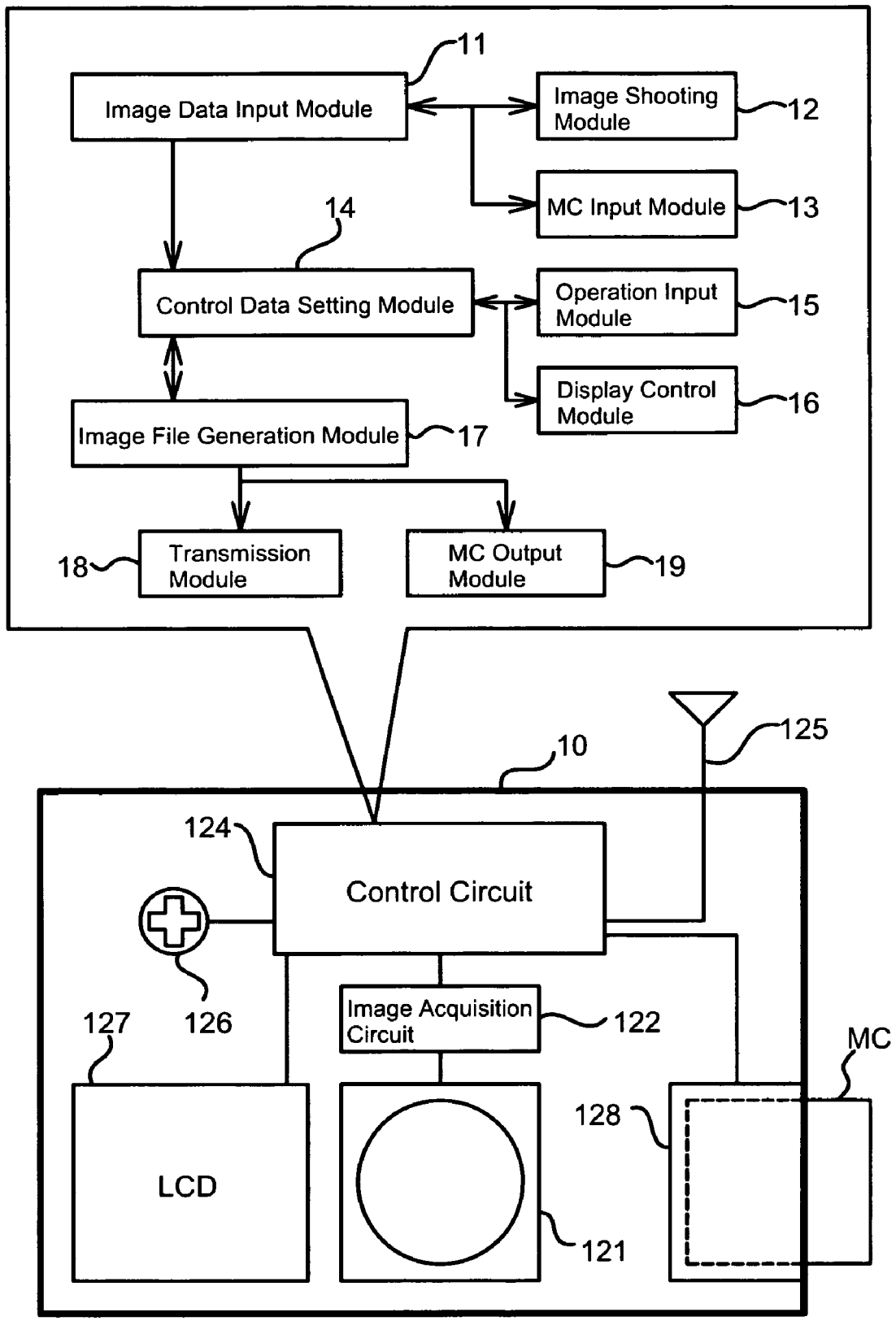
FIG. 2 is a schematic that shows the general configuration of a digital camera 10.

FIG. 2 is a schematic that shows the general configuration of the digital camera 10. The digital camera 10 generates image data by means of an optical circuit 121 that is equipped with CCD for collecting optical information and an image acquisition circuit 122 for converting voltage signals obtained in the optical circuit 121 into image data.

The image data thus obtained is defined in a color space of YCbCr. The color space YCbCr is used here because it is appropriate to the image compression in JPEG format. It should be noted, however, that the process of obtaining the YCbCr image data from the CCD voltage signals varies according to the type of the digital still camera 10.

In general, the digital still camera 10 initially obtains image data that is defined in a color space of RGB from the voltage signals that is obtained in the CCD. As for the initial color space, one of the two types of color spaces, i.e. sRGB or NTSC, is used depending on the type of the camera. Although either sRGB or NTSC defines colors in a coordinate system of RGB, a coordinate system of NTSC has a broader color reproduction range than that of sRGB. The color space sRGB is generally defined within a range of 8 bits (0–255), although the space may be extended to include negative values or values beyond 256, thereby forming an extended color space (referred to as "an extended sRGB space" herein). The information regarding the color space that was used at the time of shooting is considered as the information that represents color reproduction characteristics of the digital still camera 10, and is attached to the image data as a part of the color space parameters described above. It should be noted, however, that the extended sRGB space and the sRGB space are considered as the same coordinate system in the present embodiment and are thus represented by the same parameters. The spaces may also be distinguished and represented differently one another.

Next, the obtained image of the RGB color space can be applied with 3*3 matrix operations and be converted into the YCbCr color space. The matrix functions to convert the RGB coordinate system into the YCbCr coordinate system, and is applicable whichever color space, i.e. sRGB or NTSC is used at the time of shooting.

At the time of shooting, a user operates an operation module 126 to set a shooting mode, image processing control parameters, a layout, and etc. The information required for the setting is displayed on a LCD 127. The image data that was shot in such a way can be recorded into a memory card MC that is inserted in a memory card slot 128. The image data may also be transmitted to an image output apparatus wirelessly via an antenna 125. The image data may alternatively be communicated via a wire.

The operation of the digital still camera 10 is controlled by a control circuit 124. The control circuit 124 is configured as a microcomputer that comprises a CPU and a memory therein. As shown is the upper half of the figure, the control circuit 124 comprises software-configured functional blocks therein for such control.

An image data input module 11 receives image data via an image shooting module 12 or a MC input module 13. When the image shooting module 12 is used, the image data is generated by an image shooting operation in the optical circuit 121. When the MC input module 13 is used, the image data is loaded from a memory card MC.

A control data setting module 14 sets control data to store the data in an image file along with the image data. The control data is used to control details of image processing that is performed on the image data in the process of image output. The control data setting module 14 analyzes the image to set the control data. The control data may reflect preferences of each user in the process of setting. In other words, in case where a user has previously set adjustment data to the digital camera 10, indicating his preferences such as "higher sharpness, higher contrast" for example, the control data may reflect these preferences in the process of setting. The use interface for the process of setting is provided by an operation input module 15 and a display control module 16. The display control module 16 provides the user with information by using the LCD 17. The operation input module 15 inputs operations that are performed with operation buttons 126.

An image file generation module 17 associates the data that were respectively received from the image data input module 11 and the control data setting module 14 into one file and stores the file, thereby generating an image file. The image file has a structure similar to that described above with respect to FIG. 1.

The image file thus generated is output by a transmission module 18 or a MC output module 19. The transmission module 18 controls the wireless communication with the antenna 125. The use of the transmission module 18 allows for the transmission of the image file to an image processing system 100 via a network INT. The MC output module 19 controls writing operations into the memory card MC. The use of the MC output module 19 allows for the passing of the image file to the image processing system 100 or any other external device by using the memory card MC.

B. Generation of Image File

Figure 3:
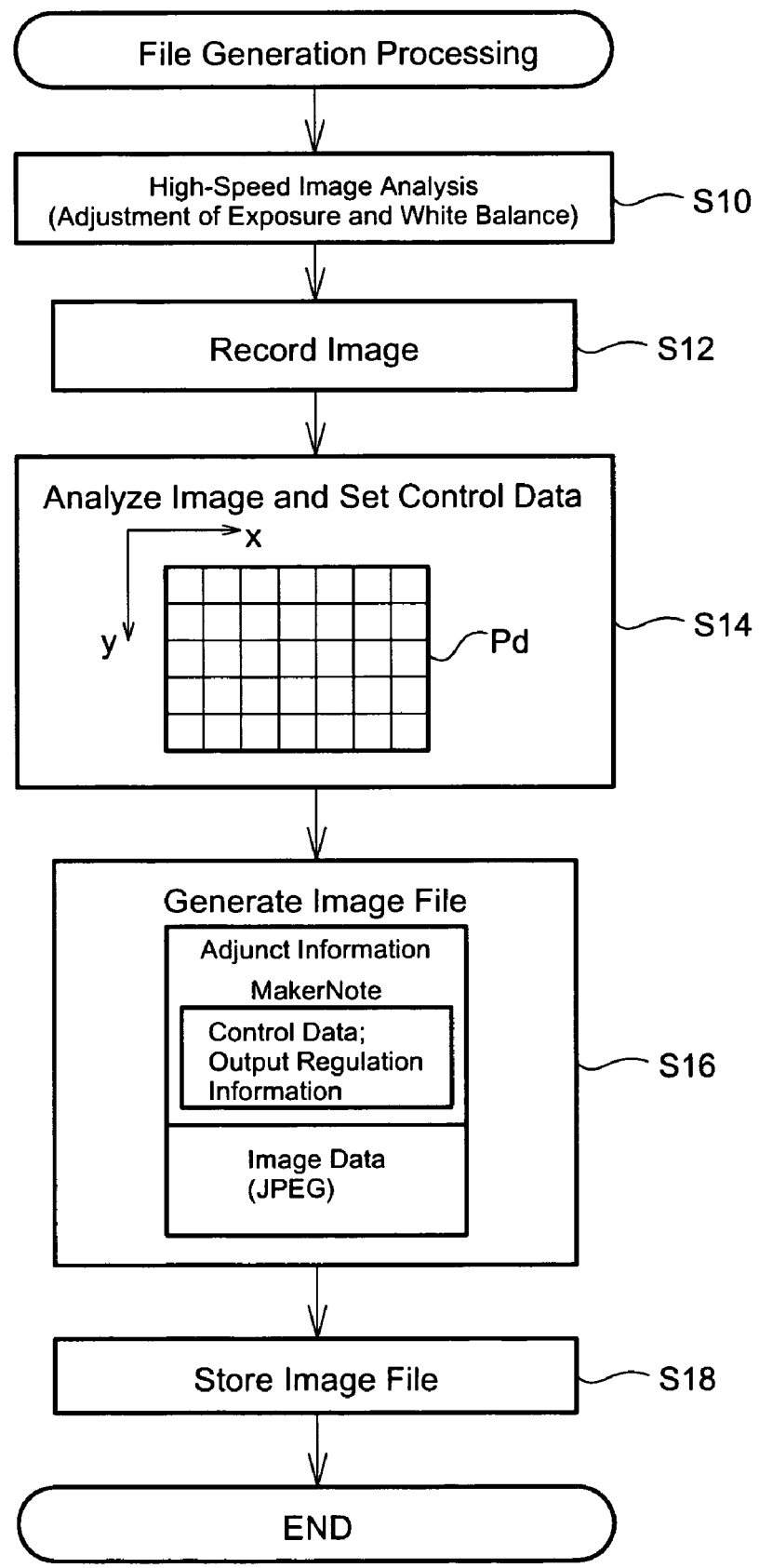
FIG. 3 is a flowchart of the generation processing of an image file.

FIG. 3 is a flowchart of the generation processing of an image file, which is performed by the control circuit 124 of the digital camera 10. The processing starts when a user focuses on an object and presses a shutter button halfway down. When the processing starts, the control circuit 124 performs a high-speed analysis in step S10. The process is performed to analyze an image that was obtained in CCD so as to adjust on-shooting characteristics such as exposure, white balance, and etc.

When the analysis is complete and the shutter button is pressed all the way down, the control circuit 124 then performs recording of an image in step S12. At this time, voltage signals obtained in the CCD are temporally converted to RGB data as described previously.

The control circuit 124 then analyzes the image and sets control data based on the obtained RGB image data in step S14. As described previously, the control data includes color space parameters and color correction parameters in the present embodiment. The color space parameters are determined previous to the image analysis, according to the color space that was used at the time of shooting. On the other hand, the color correction parameters are set based on the image analysis, and include: contrast, brightness, color balance, white balance, chromaticness, sharpness, memory color, and etc. As an example, image data Pd is illustrated is FIG. 3. The image data Pd is configured as a two-dimensional array of pixels (each shown as a square) that are arranged in x-direction and y-direction. The pixels may sometimes require two-dimensional analysis on their tone values depending on the details of the image analysis, e.g. in case where the sharpness is to be set. In such a case, the two-dimensional analysis is preferably performed from the viewpoint of the improvement in image quality. However, only simplified analysis in the x-direction or in the y-direction is performed in the present invention from the viewpoint of the speeding up of processing speed. As for the color correction parameters, not all of them are necessarily set based on the image analysis, but only some of them may be set so. Alternatively, the color correction parameters may be a mixture of two types of parameters:

parameters that are set based on the analysis of the image data; and parameters that are previously prepared irrelevant to the image data.

A method of setting color correction parameters are described in the following by taking a setting of contrast as an example. The control circuit 124 scans the pixels of the image data Pd progressively to obtain a distribution of brilliance Y. Since the image data Pd is RGB tone values in the present embodiment, values corresponding to the brilliance Y may be calculated based on these tone values. The contrast can be modified by converting the brilliance of each pixel through a formula "y=aY+b", wherein a and b represent real-valued coefficients that define a method of adjusting contrast. In the present embodiment, each of the coefficients a and b is set as one of the color correction parameters in step S14. The conversion process is performed in the image output apparatus with the use of the coefficients and the conversion formula.

The coefficients a and b can be set in various way, e.g. by a method that uses the distribution of brilliance Y. For example, the coefficients a and b can be set by using a maximum value Ymax and a minimum value Ymin of the brilliance Y in the following formulas:

$$a=255/(Y\max-Y\min);$$

$$b=-a*Y\min \text{ or } 255-a*Y\max.$$

In this manner, the distribution of brilliance can be extended to the fullest extent. Alternatively, each end of the actually obtained distribution of brilliance may be truncated by a certain range of distribution to define the maximum value Ymax and the minimum value Ymin. The coefficients a and b can be set in various ways and the contrast can be controlled with the values of the coefficients. The control circuit 124 sets the values of the coefficients a and b based on an operational expression or a table that is previously prepared by taking the shooting characteristics of the digital camera 10 into consideration.

Although the setting of the control data was described above with respect to the adjustment of contrast, this process equally applies to other processing, so that the control data can be set in the form of parameters or a table that is used for operations in the image output apparatus.

The control circuit 124 may also reflect preferences of each user in the process of setting color correction parameters in step S14. As described previously, in the present embodiment, preferences such as "higher sharpness, higher contrast" can be preset as adjustment data in the digital camera 10. The control circuit 124 can thus reflect the adjustment data in the process of setting the aforementioned parameter values in step S14. For example, in case where the contrast is set to be higher, the control circuit 124 can reflect this adjustment data by further multiplying the above described coefficient a by a certain enhancing coefficient. It should be noted, however, that the effect on the color correction parameters by the setting such as "higher" or "lower" is only a matter of design variation, so that such adjustment data can be set in an arbitrary manner.

The control circuit 124 generates an image file that includes the obtained control data in step S16 and stores the file in e.g. a medium in step S18. The structure of the image file is similar to the one described above with respect to FIG. 1.

Although the process of recording an image in the form of RGB data in step S12 and analyzing the data in step S14 was illustrated in the present embodiment, the image analysis is not necessarily based on the RGB data. For example, the control circuit 124 may record other types of data, e.g. the data that was obtained in the CCD (referred to as RAW data herein after) or the data that was converted into YCbCr data, in step S12 and may perform the image analysis based on such data. It should be noted, however, in case where the color space of the image analysis is different from that of the image processing, it may be preferable to predefine a method of setting control data so that both of the result of the analysis and the difference between the color spaces can be reflected in the process of setting control data.

C. Output of Image

Figure 4:
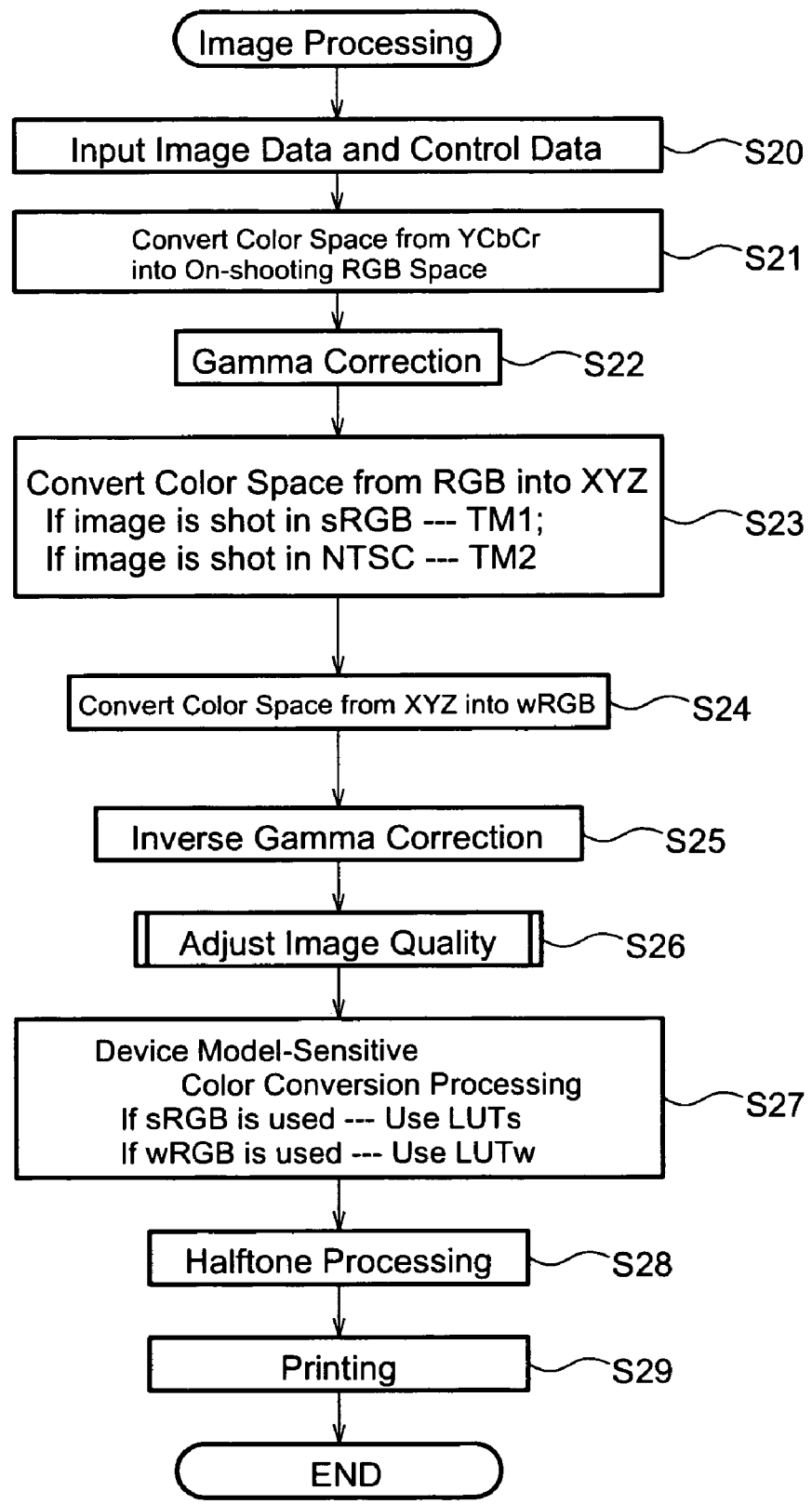
FIG. 4 is a flowchart of the image processing.

FIG. 4 is a flowchart of the image processing, which is performed by the computer PC that is a constituent of the image output apparatus. Firstly, the computer PC inputs image data and control data in step S20. The computer PC analyzes the image data, which is received via a network from the digital still camera 10 or is loaded from the memory card MC, and extracts the image data and the control data.

The computer PC then performs a variety of image processing discussed later. Since the image data is defined in the YCbCr color space in the present embodiment, the computer PC converts the image data to the RGB color space, i.e. a color space that was used at the time of shooting, in step S21. The conversion process is performed with an inverse matrix of the matrix that was used for the conversion from the RGB space to the YCbCr space in the digital still camera 10. The image data is thus converted to an on-shooting color space, i.e. either one of NTSC, sRGB, or extended sRGB. In case where the image data is converted to the extended sRGB color space, the resulting image data includes negative values as well as values beyond 256 at this point.

The computer PC then performs a gamma correction on the image data in step S22. The gamma value that is used in the gamma correction is included in the control data as the information that represents characteristics of the digital still camera 10.

When the gamma correction completes, a process of conversion is performed to convert the color space of the image data to wRGB color space, i.e. a color space that is defined in a wider color reproduction range than the sRGB. This is because if the image data that was shot in the NTSC color space or the extended sRGB color space is processed in the sRGB color space that has a narrower color reproduction range, there may be a possibility that the colors of the object can not be reproduced exactly. In this view, the image data that was shot in the sRGB space may possibly skip some steps as will be discussed later. However in the present embodiment, since the color space information that is included in the control data does not distinguish between the sRGB space and the extended sRGB space, the image data that was taken in the sRGB space also goes through the conversion process to the wRGB space.

The conversion to the wRGB color space is performed by matrix operations. As described previously, the computer PC deals with the image data that is defined in the sRGB color space or in the extended sRGB color space and the image data that is defined in the NTSC color space. Although a matrix can be defined to convert each color space directly into the wRGB color space, each color space is converted through the intermediary of a standard XYZ color space in the present embodiment.

Firstly, the computer PC converts the RGB color space to the XYZ color space in step S23. The conversion process varies according to the type of the color space that defines the image data. In other words, by preparing two types of conversion matrixes beforehand: a conversion matrix TM1 for the sRGB color space or the extended sRGB color space; and a conversion matrix TM2 for the NTSC color space, and by separately using one of them in individual cases, the conversion process can be achieved in response to the color space that was used at the time shooting. In this manner, the image data can always be converted into the standard XYZ color space, no matter in which color space the image data was shot.

Next, the computer PC converts the XYZ color space into the wRGB color space in step S24. The conversion process is also a matrix operation. The conversion process can be achieved by a single matrix regardless of the color space that was used at the time of shooting. The matrix that is used for the operation may be set arbitrarily according to the definition of the wRGB color space.

As described previously, the image data that was shot in the sRGB color space does not require the conversion into a wider color space. Accordingly, the steps S23 and S24 may be skipped for such image data. In case where the NTSC color space is used as the color space that is wider than the sRGB color space, the steps S23 and S24 may be skipped for the image data that was shot in the NTSC color space. In this way, the processing in the steps S23 and S24 may be skipped as appropriate according to the relative relationship between the color space that was used at the time of shooting and the color space that is to be used at the end.

When the conversion of color spaces completes, the computer PC performs an inverted gamma correction in step S25. The gamma value that is used in this process is determined based on color reproduction characteristics of the output apparatus. In case where the type of the output apparatus is already known at the time of shooting, the gamma value may be included in the control data that is attached to the image data.

Next, the computer PC performs an automatic adjustment of image quality in order to reflect on-shooting intentions in step S26. In the present embodiment, the color correction parameters are included in the control data, and the computer PC automatically adjusts the image quality based on these parameters. The method of image quality adjustment based on each parameter is well-known in the art and is not described in detail herein.

The correction of the image data thus completes and obtains the image data that reflects the color reproduction characteristics of the digital still camera 10 and the on-shooting intentions. The computer PC then performs some processing in preparatory for the execution of printing. Firstly, the computer PC performs a color conversion of the image data in step S27, which is a process for converting the RGB color system into a CMYK color system, i.e. a color system that is used in printers. The conversion process is achieved by referencing a conversion-used look-up table (LUT) that relates the colors of each color system one another. A table LUTw, which is for the conversion from the wRGB color space into the CMYK color space, is typically used in the present embodiment. It should be noted, however, that the computer PC can also deal with the image data that is defined in the sRGB color space. The computer PC thus comprises a table LUTs for the conversion from the sRGB color space as well as the table LUTw, and selects and uses one of them according to in which color space the image data is defined. For example, the table LUTs can be applied to a case where the color space conversion process of steps S23 and S24 were skipped for the image data that was shot in the sRGB color space, and the received image file is output without going through any adjustment of image quality.

The computer PC then performs half-tone processing on the image data that was converted to have CMYK tone values in step S28. The half-tone processing is used to represent the tone values of the image data with density of dots that are created by the printer, and can be achieved by a well-known method such as an error diffusion method, an organized dithering method, and etc. In addition to the above-described processing, the computer PC may also perform other processing as well, such as resolution conversion processing for adapting the resolution of the image data to the resolution of the printer, interlace data generation processing for setting the data array and the sub-scanning feed rate in a way to allow for the interlace recording in the printer, and etc. The computer PC then directs the printer PRT to perform the printing based on the generated print data in step S30.

The system of the present embodiment described above provides various advantages as discussed below. First, by setting the control data, the system can control the details of the image processing that is performed in the computer PC. At this time, the output state of the image can be adjusted while the original image data is retained without modification. Secondly, since the image processing is performed in the computer PC, the digital camera 10 can be reduced with processing load. Thirdly, since the control data is set based on the image analysis in the digital camera 10, the setting of the control data can make the best use of the characteristics of the digital camera 10 and of the image.

D1. Modifications

Figure 5:
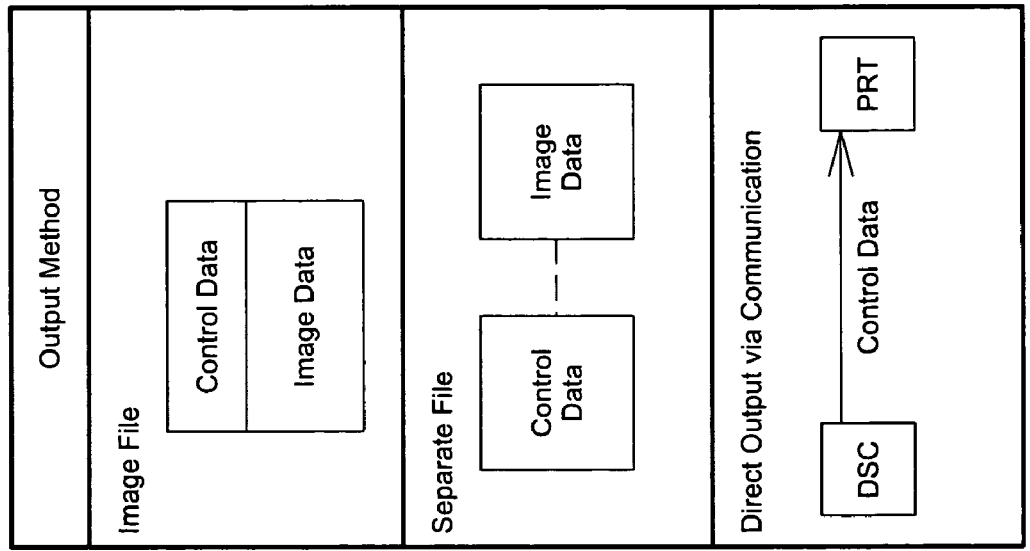
FIG. 5 is a schematic that shows combinations of modifications in the present embodiment.
Figure 5:
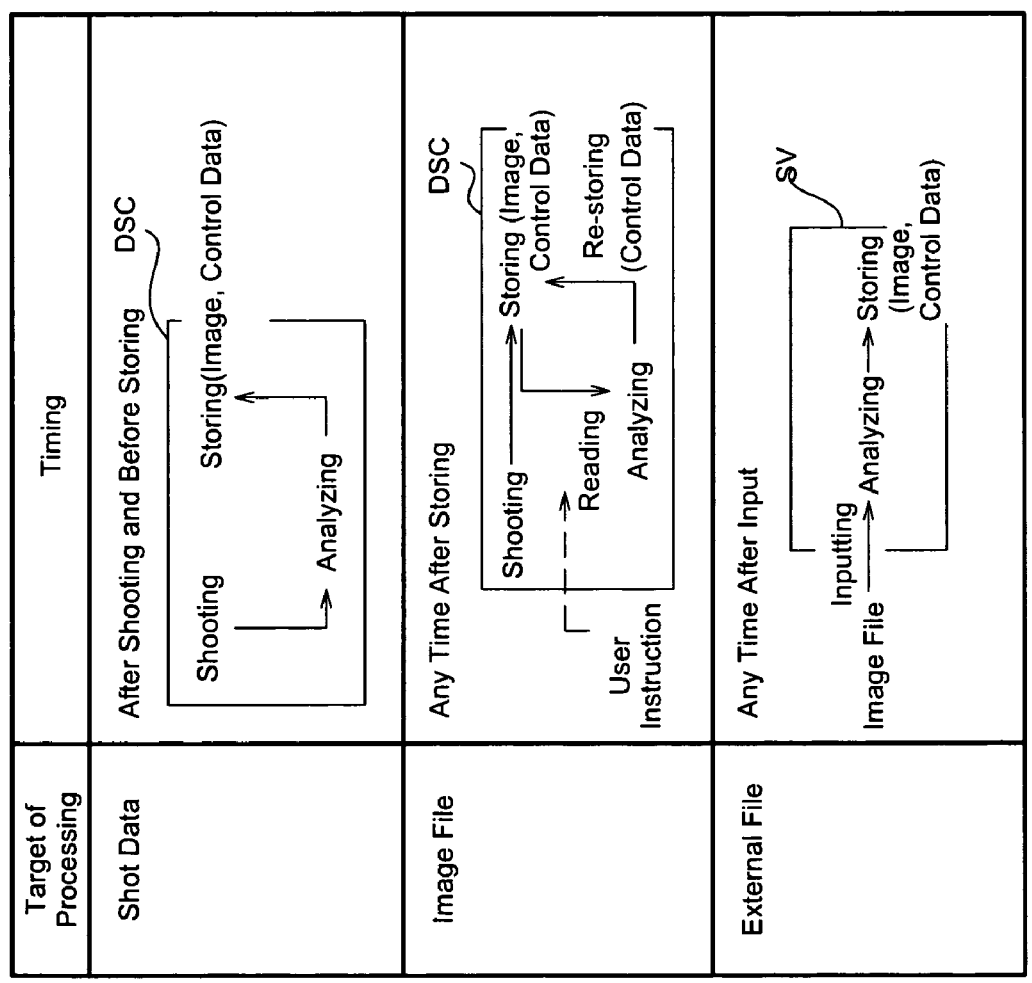

FIG. 5 is a schematic that shows combinations of modifications in the present embodiment. The present invention can be implemented in various modifications by combining: a method that analyzes image data to set control data; and a method that uses the control data to output an image. Three variations are shown for the control data setting method and another three variations are shown for the image output method. Each variation of either method can be combined independently with any of the variations of the other method, so that total of nine configurations can be implemented within the range of the illustration.

The control data setting methods can be distinguished into three variations according to the type of processing target or image data that is used in the setting process and the timing to perform the setting process. For the sake of convenience, the present embodiment was described in terms of storing an image file after control data is set. It should be noted, however, that the process of storing may be modified to any of three variations of the image output method as discussed below.

A first aspect of the control data setting method targets at on-shooting data, and is performed after shooting and before storing image data. The processing is equivalent to the processing described above as an embodiment (see FIG. 3). In this aspect, control data is set in a digital camera DSC by analyzing image data that was just shot. The image data is then stored as an image file along with the control data.

A second aspect of the control data setting method targets at an initially stored image file and is performed after shooting. In this case, the digital camera DSC stores the on-shooting data as an image file without performing an analysis for the control data setting. At this time, the image file may be attached with some control data that does not require any analysis, e.g. a color correction parameter. The digital still camera then reads out the image file at a timing such as when instructed by a user, performs the image analysis, and then sets the control data. Alternatively, the processing may be performed under lower processing load conditions irrespective of instructions from the user, e.g. when the digital still camera DSC is not used for shooting. The image file is then stored again, this time including the control data that was obtained from the analysis. Alternatively, only the control data may be stored newly or the control data as well as the image data may be stored again altogether. The second aspect of the method can advantageously reduce the on-shooting processing load.

In the second aspect, the initially stored image file may take various formats: JPEG compression format, RAW data format, and etc. It is particularly preferable to store the image file in a format that can exactly maintain the on-shooting information, e.g. RAW data format. This allows for improvement in precision of reading and analyzing the initially stored file, thereby enhancing the image quality. As described previously with respect to the above embodiment, the image quality can be analyzed in various formats: RGB data, YCBCr data, RAW data, and etc. After the control data was set by the analysis, the image file is preferably compressed with JPEG format and then stored again. This allows for control of capacity of the eventually obtained image file. As can be seen, the image file that will go through the image analysis is stored in a format such as RAW data, whereas the image data that has gone through the image analysis is stored in another format that has compressed amount of data. This allows for reduction in capacity of the image file as well as improvement in the image quality.

A third aspect of the control data setting method sets control data irrespective of shooting. The processing can be performed in a place that provides image data to the computer PC, e.g. in a server. The server SV inputs a separately prepared image file and analyzes the file to set control data. The server SV then creates and stores an image file that contains the control data therein. The process of storing can be implemented in various aspects in connection with the output methods as described below. For example, the image data and the control data may be stored together as one image file, or only the control data may be stored as a separate file. The analysis of the image data is not necessarily performed in a generation device that generates image files such as the digital camera 10, but may also be carried out in a processing device that performs image processing such as the computer PC. Throughput for the image analysis may be compared between the generation device and the processing device to determine whether or not to perform the image analysis in the generation device. The generation device may perform the analysis if the generation device has a higher throughput, and the processing device may perform the analysis if the processing device has a higher throughput. The throughput of the processing device may be prestored in the generation device in correlation with the type of the processing device, or may be obtained by the communication between the generation device and the processing device. In case where the generation device does not perform the analysis, the generation device may generate the control data that instructs execution of the analysis in the processing device and attach the data to the image file A first aspect of the output method is to output an image file, which is equivalent to the aspect that is employed in the above embodiment (see FIG. 3). In this aspect, image data and control data are combined together to form an image file, which is then output to the computer PC via media or communication. In this aspect, the image data and the control data can be transferred together, which makes the file easier to treat with.

A second aspect of the output method is to output an image file and control data separately as individual files. The files are created as individual files in this aspect. It should be noted, however, the files are associated one another. According to the aspect, the control data can be advantageously shared by plural pieces of image data.

A third aspect of the output method is to output image data directly via communication. For example, control data that was set by e.g. the digital camera DSC is transmitted to the computer PCPRT via communication without being stored as a file. The image data may also be transferred via communication as similar to the control data, or the image data may be transferred via media separately.

D2. Other Modes of Modifications

Although the present invention has been illustrated in terms of including some color space parameter in the control data and performing the color conversion process (e.g. the steps S23 and S24 in FIG. 4) according to the color space parameter when outputting images, the present invention may also skip such color space parameter-related process as well.

Although the embodiment and the modification are illustrated in terms of using a digital camera as an image shooting apparatus, other apparatuses such as a digital video camera or a scanner may also be used as well. Additionally, the present invention is not only applicable to static images but is also applicable to moving images as well. As for moving images, the processing of the present invention can be applied to every frame that constitutes a moving image, or can be applied at certain timings such as at every scene transition.

Although various embodiments of the present invention are described above, it is clearly understood that the present invention is not restricted to the above embodiments, but there may be various configurations without departing from the spirit of the present invention. The processing of control described above may be implemented not only in a software manner but also in a hardware manner as well.

INDUSTRIAL APPLICABILITY

The present invention can be applied to techniques of controlling image processing that are performed in image output apparatuses and of implementing desirable image outputs.

The invention claimed is:

1. An image output control apparatus that controls output of image data comprising:
    an input module that inputs said image data;
    an analysis module that performs an image analysis of said image data;
    an analysis control module that controls operation of said analysis module based on comparison of throughputs between said image output control apparatus and an image output apparatus with respect to said image analysis, said image output apparatus performing image quality adjustment of said image data;
    a color correction parameter determination module that determines a color correction parameter that is used for said image quality adjustment of said image data according to analysis result of said image data, said color correction parameter including at least one of parameters relating to contrast, lightness, color balance, white balance, saturation, sharpness, and memory color; and
    an output module that outputs said color correction parameter in correlation with said image data.

2. The image output control apparatus according to claim 1, further comprising:
    an image shooting module that shoots images;
    wherein said image data is output data from said image shooting module.

3. An image shooting apparatus comprising:
    an image output control apparatus according to claim 2, and an image file generation module that generates an image file by relating said color correction parameter and said image data to one another.

4. The image output control apparatus according to claim 1, further comprising:
a memory module that stores adjustment data beforehand, said adjustment data being used to adjust setting of said color correction parameter;
wherein said analysis module reflects said adjustment data to set said color correction parameter.

5. The image output control apparatus according to claim 1, wherein said analysis control module brings said analysis module into operation in a case where said image output control apparatus has a higher throughput.

6. The image output control apparatus according to claim 1, wherein said analysis control module halts operation of said analysis module and causes said image output apparatus to perform said image analysis, in a case where said image output control apparatus has a lower throughput.

7. The image output control apparatus according to claim 1, wherein said output module outputs an image file that comprises said image data and said color correction parameter integrated together.

8. The image output control apparatus according to claim 1, wherein said output module outputs said color correction parameter as a separate file that is associated with said image data.

9. The image output control apparatus according to claim 1, wherein said output module outputs said color correction parameter to said image output apparatus via communication.

10. A color correction parameter setting method that controls output of image data, comprising:
a process of inputting said image data;
a process of performing image analysis of said image data;
a process of controlling the performing of the image analysis of said image data based on comparison of throughputs between an image output control apparatus and an image output apparatus with respect to said image analysis, said image output apparatus performing image quality adjustment of said image data;
a process of determining a color correction parameter that determines said color correction parameter that is used for said image quality adjustment of said image data according to analysis result of said image data, said color correction parameter including at least one of parameters relating to contrast, lightness, color balance, white balance, saturation, sharpness, and memory color; and
a process of outputting said color correction parameter in correlation with said image data.

11. A computer-readable storage medium that is encoded with a computer program to control output of image data, said computer program causing a computer to implement:
a function of inputting said image data;
a function of performing image analysis of said image data;
a function of controlling the performing of the image analysis of said image data based on comparison of throughputs between an image output control apparatus and an image output apparatus with respect to said image analysis, said image output apparatus performing image quality adjustment of said image data;
a function of determining a color correction parameter that determines said color correction parameter that is used for said image quality adjustment of said image data according to analysis result of said image data, said color correction parameter including at least one of parameters relating to contrast, lightness, color balance white balance, saturation, sharpness, and memory color; and
a function of outputting said color correction parameter in correlation with said image data.

* * * * *